(12) United States Patent
Missiaggia et al.

(10) Patent No.: US 11,807,040 B2
(45) Date of Patent: Nov. 7, 2023

(54) WHEEL HUB ASSEMBLY FOR VEHICLES

(71) Applicant: Aktiebolaget SKF, Gothenburg (SE)

(72) Inventors: Giorgio Missiaggia, Trieste (IT); Fausto Morello, Sommariva del Bosco (IT)

(73) Assignee: AKTIEBOLAGET SKF

( * ) Notice: Subject to any disclaimer, the term of this patent is extended or adjusted under 35 U.S.C. 154(b) by 291 days.

(21) Appl. No.: 16/732,900

(22) Filed: Jan. 2, 2020

(65) Prior Publication Data
US 2020/0215852 A1 Jul. 9, 2020

(30) Foreign Application Priority Data
Jan. 9, 2019 (IT) .................. 102019000000247

(51) Int. Cl.
*B60B 7/00* (2006.01)
*B60B 27/06* (2006.01)

(52) U.S. Cl.
CPC .......... *B60B 7/0013* (2013.01); *B60B 27/06* (2013.01)

(58) Field of Classification Search
CPC ..... B60B 27/06; B60B 27/065; B60B 7/0013; B60B 7/0066; B60B 7/0073
USPC ...................................... 301/105.1
See application file for complete search history.

(56) References Cited

U.S. PATENT DOCUMENTS

| | | | |
|---|---|---|---|
| 3,393,015 A * | 7/1968 | Kaufman | F16C 33/723 277/921 |
| 5,217,137 A * | 6/1993 | Andrews | F16C 33/726 220/366.1 |
| 5,296,805 A * | 3/1994 | Clark | B60T 8/171 188/181 R |
| 5,702,162 A * | 12/1997 | Pressler | B60B 27/001 180/247 |
| 6,217,220 B1 * | 4/2001 | Ohkuma | B60B 27/00 301/108.1 |
| 6,929,331 B2 * | 8/2005 | Ohtsuki | B60B 27/0005 301/105.1 |
| 7,287,909 B2 * | 10/2007 | Sakamoto | F16C 43/04 384/482 |
| 7,758,248 B2 * | 7/2010 | Aida | B60B 27/00 384/477 |
| 9,328,770 B2 * | 5/2016 | Ishida | F16C 33/768 |
| 9,701,159 B2 | 7/2017 | Duch et al. | |
| 10,029,513 B2 * | 7/2018 | Kawamura | F16C 27/066 |
| 10,081,218 B2 * | 9/2018 | Wakatsuki | G01P 3/443 |

(Continued)

FOREIGN PATENT DOCUMENTS

| EP | 2657557 | 10/2013 |
|---|---|---|
| EP | 2752590 | 10/2013 |

OTHER PUBLICATIONS

International Search Report for corresponding Italy Patent Appln. No. 201900000247 dated Sep. 27, 2019.

*Primary Examiner* — Jason R Bellinger
(74) *Attorney, Agent, or Firm* — Reed Smith LLP

(57) ABSTRACT

A wheel hub assembly for mounting on an upright of a vehicle has a flanged outer ring provided with a tubular mounting portion inserted over a first axial length (L1) inside a seat of the upright; and a plastic cover having a mounting portion which is also engaged inside the tubular portion, wherein the mounting portion extends outside the tubular portion over a second axial length (L2) which, together with the first axial length (L1), covers less than a mounting length (L) inside the seat.

4 Claims, 2 Drawing Sheets

(56) References Cited

U.S. PATENT DOCUMENTS

| | | | |
|---|---|---|---|
| 10,093,126 B2* | 10/2018 | Weigand | B60B 27/0073 |
| 2006/0192423 A1* | 8/2006 | Song | B60B 27/0094 |
| | | | 301/105.1 |
| 2008/0031561 A1* | 2/2008 | Hakata | B60B 7/061 |
| | | | 384/544 |
| 2015/0091368 A1* | 4/2015 | Morello | B60B 27/0005 |
| | | | 301/108.3 |

* cited by examiner

WHEEL HUB ASSEMBLY FOR VEHICLES

CROSS-REFERENCE TO RELATED APPLICATION

This application claims the benefit of priority to Italian Application No. 102019000000247 of the same title filed on Jan. 9, 2019, under 35 U.S.C. § 119, the entire contents of which are incorporated herein by reference.

FIELD

The exemplary embodiments disclosed herein relate to a wheel hub assemblies.

BACKGROUND

Wheel hub assemblies, e.g., the wheel hub assembly illustrated in FIG. 1, may be arranged between an upright 1 and a wheel (not shown) of a vehicle so as to allow rotation of the wheel with respect to the upright 1. Such a wheel hub includes a flanged outer ring 10 assembled in upright 1 and also includes a closing cover 20 that is mounted on such a flanged outer ring 10 so as to close at least one side thereof.

The flanged outer ring 10 is provided both with a tubular mounting portion 11 that may be inserted over a whole of its axial length inside a respective cylindrical seat 2 of the upright 1 and with a flange 12 which axially bounds tubular portion 11 and is arranged axially abutting against upright 1. A closing cover 20 is mounted inside tubular portion 11 so as to protect an inside portion of flanged outer ring 10. Such a closing cover 20 may be provided with a cylindrical keying portion 21 engaged over its whole length inside the tubular portion 11.

BRIEF DESCRIPTION OF THE DRAWINGS

The invention will now be described with reference to the accompanying drawings which illustrate a non-limiting example of embodiment thereof, in which.

DETAILED DESCRIPTION

Figure 1:
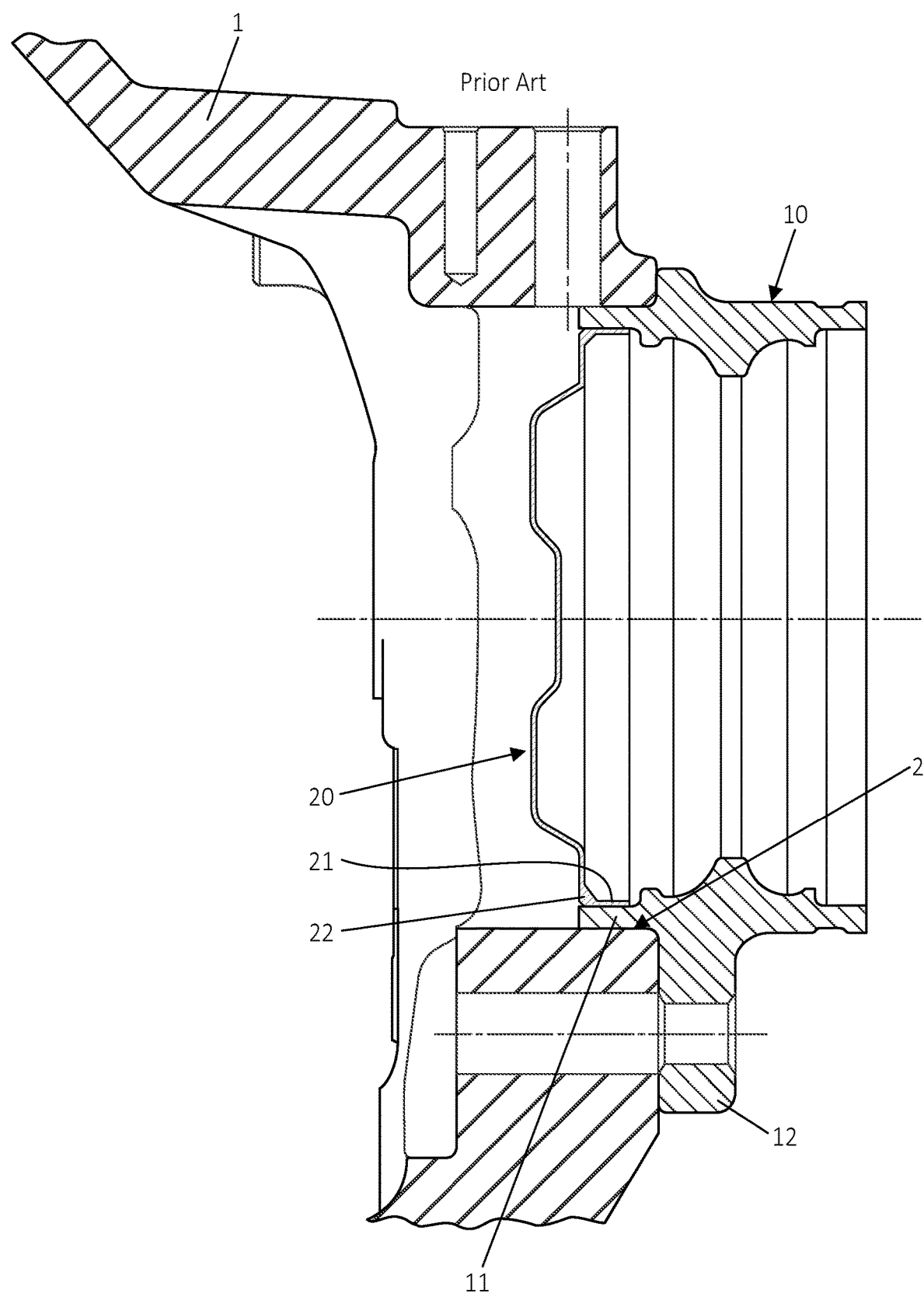
FIG. 1 illustrates known wheel hub assemblies.

In wheel hub assemblies illustrated by FIG. 1, in order to ensure sealing between, and assembly of, the flanged outer ring 10 and cover 20, a cover 20 must be made of metallic material and must also be provided with a sealing element 22 usually made of rubbery material and arranged, substantially compressed, between cylindrical keying portion 21 and tubular portion 11, while a cylindrical keying portion 21 must have a tubular portion 11 with a given mounting length so as to be able to receive inside it the whole of cylindrical keying portion 21. Therefore, the dimensions of flanged outer ring 10 and both the material of the cover 20 and the dimensions of the said cover 20 result in wheel hub assemblies that are not competitive from the point of view of weight and production costs, and because use of sealing elements, e.g., sealing element 22, made of rubbery material must be provided for.

Figure 2:
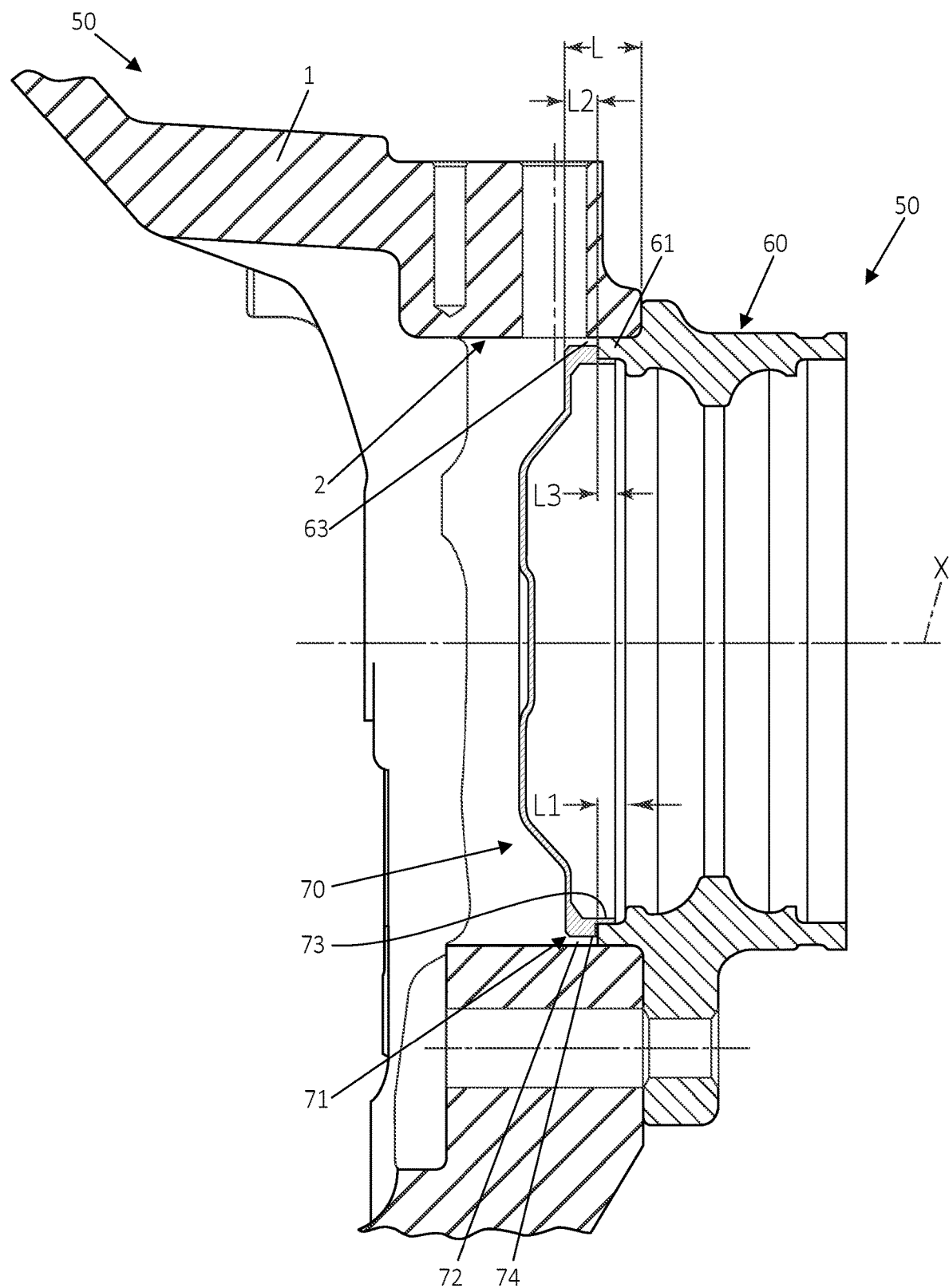
FIG. 2 illustrates exemplary wheel hub assemblies in accordance with this disclosure.

An exemplary embodiment of wheel hub assembly 50, illustrated in FIG. 2, is mounted on an upright 1 of a vehicle (not shown) and comprises a flanged outer ring 60 provided both with a tubular mounting portion 61 inserted over a whole of its axial length L1 inside a respective cylindrical seat 2 of the upright 1 and with a flange 61 which axially bounds the tubular portion 61 and is arranged axially abutting against the upright 1. Wheel hub assembly 50 has a central axis X and includes a cover 70 which closes an axial side of a flanged outer ring 60 and is provided with a cylindrical mounting portion 71, which is also engaged inside the tubular portion 61 so as to rigidly connect together the outer ring 60 and the cover 70.

According embodiments in accordance with this disclosure, a cover, e.g., 70 is made of plastic material, rather than a cover formed of a metal material, e.g., cover 20. A cover 70, therefore, is therefore lighter than known covers, and may also be produced in a more flexible manner. In particular, a cylindrical mounting portion 71 includes an outer cylindrical edge 72 and an engaging edge 73 which is radially lowered with respect to the outer cylindrical edge 72 and is engaged over a whole of its axial length L3 inside tubular mounting portion 61, allowing outer cylindrical edge 72 to be positioned outside and axially aligned with the said tubular portion 61.

An outer cylindrical edge 72 has an axial length L2 which, together with the axial length L1 of tubular portion 61, covers at most a given mounting length L of an upright. A mounting length L, as used herein, being defined as that axial length of seat 2 that a combination of cover 70 and flanged outer ring 60 may occupy inside seat 2 without interfering with other mechanical or electrical elements with which upright 1 is normally provided (and which are not shown here). Moreover outer cylindrical edge 72 has an outer diameter with dimensions smaller than dimensions of an outer diameter of the tubular portion 61 so as to leave a gap between outer cylindrical edge 72 and seat 2 and so that, in the event of any loads acting on the tubular portion 61 of outer ring 60 during use, cover 70 would be shielded therefrom or protected, while also favouring fluid-tight seal which cover 70 forms on the outer ring 60.

Since, as is clear from the above description, tubular portion 61 does not occupy a whole mounting length L which, in accordance with this disclosure, is occupied also by the outer cylindrical edge 72 of cover 70 made of plastic material, a result is that outer ring 60 has a smaller amount of metallic material than outer rings, e.g., 10, of the type shown in FIG. 1, being therefore advantageously lighter in terms of weight.

In order to ensure a fluid-tight seal between cover 70 and flanged outer ring 60, engaging edge 73 is axially bounded by an axial shoulder 74 arranged axially abutting against a front annular surface 63 of a tubular mounting portion 61. A shoulder 74 may be preferably, but not necessarily, be lined with a sticky/sealing material in order to increase both fluid tightness and mechanical seal between cover 70 and flanged outer ring 60.

In exemplary embodiments, a wheel hub assembly for mounting on an upright of a vehicle includes a flanged outer ring 60 provided with a tubular mounting portion 61 inserted over a whole of a first axial length L1 thereof inside a respective seat 2 of the upright 1; and also includes a cover 70 for closing the flanged outer ring 60, having a mounting portion 71 which is also engaged inside the tubular portion 61. Such a wheel hub assembly 50 includes a cover 70 made of plastic material. Such a cover may also include a mounting portion 71 that extends outside tubular portion 61 over a second axial length L2 which, together with the first axial length L1, covers at most a given mounting length L inside the seat 2.

In interrelated exemplary embodiments, a wheel hub assembly includes mounting portion 71 that includes an outer edge 72 and an engaging edge 73 that is radially lowered with respect to the outer edge 72 and is engaged over the whole of a third axial length L3 thereof inside a tubular mounting portion 61.

In interrelated exemplary embodiments, a wheel hub assembly includes an engaging edge 73 that has an axial shoulder 74 arranged axially abutting against the tubular mounting portion 61.

In interrelated exemplary embodiments, a wheel hub assembly, e.g., 50, includes a flanged outer ring, e.g., 60, having a tubular mounting portion 61 that is configured to receive an axial shoulder 74 of an engaging edge 73.

While the exemplary embodiments illustrated in FIG. 2 provide a wheel hub assembly for vehicles, which is not only competitive from the point of view of weight and cost, but also simple and inexpensive to manufacture, the invention is generally applicable not only to the configuration as described in FIG. 2, but more generally to any wheel hub assembly for vehicles.

We claim:

1. A wheel hub assembly cover formed of plastic comprising:
    a cylindrical mounting portion comprising:
        a continuous radially extending cover end;
        an outer cylindrical edge extending axially from a circumferential end of the radially extending cover end and configured to define an radial gap between a seat of an upright and the outer cylindrical edge; and
        an engaging edge extending axially from an axial end of the outer cylindrical edge in a direction away from the radially extending cover end,
        wherein the engaging edge extends axially further than the outer cylindrical edge, and
        an axial shoulder of the engaging edge is lined with a sealing material and axially abuts against an axially facing front annular surface of a tubular mounting portion of a wheel hub assembly.

2. A wheel hub assembly for mounting on an upright of a vehicle, comprising:
    a flanged outer ring provided with a tubular mounting portion inserted over a first axial length (L1) inside a seat of the upright, wherein the first axial length (L1) is less than a mounting length (L) of the upright; and
    a plastic cover on one side of the flanged outer ring, the plastic cover comprising:
        a cylindrical mounting portion having a continuous radially extending cover end;
        an outer cylindrical edge extending axially from a circumferential end of the radially extending cover end and defining an radial gap between the seat of the upright and the outer cylindrical edge; and
        an engaging edge extending axially from an axial end of the outer cylindrical edge in a direction away from the radially extending cover end,
        wherein the engaging edge extends axially further than the outer cylindrical edge, and
        the engaging edge an axial shoulder lined with a sealing material and axially abutting against the tubular mounting portion.

3. The wheel hub assembly of claim 2, wherein the outer cylindrical edge comprises a radial length greater than a radial length of the engaging edge.

4. The wheel hub assembly of claim 3, wherein the engaging edge is configured to be engaged over a third axial length (L3) inside the tubular mounting portion.

* * * * *